(12) United States Patent
Seiler et al.

(10) Patent No.: US 11,334,131 B2
(45) Date of Patent: May 17, 2022

(54) POWER MANAGEMENT IN POWER ADAPTERS TO DELIVER POWER TO A POWER OUTPUT COUPLED TO AN ELECTRONIC DEVICE IN ACCORDANCE WITH POWER SUPPLY CAPABILITY INFORMATION

(71) Applicant: Hewlett-Packard Development Company, L.P., Spring, TX (US)

(72) Inventors: Peter Seiler, Fort Collins, CO (US); Adolfo Gomez, Fort Collins, CO (US); Chun-Yi Lai, Taipei (TW); Hoang Van Ngo, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/046,005

(22) PCT Filed: Jul. 25, 2018

(86) PCT No.: PCT/US2018/043713
§ 371 (c)(1),
(2) Date: Oct. 8, 2020

(87) PCT Pub. No.: WO2020/023033
PCT Pub. Date: Jan. 30, 2020

(65) Prior Publication Data
US 2021/0294401 A1    Sep. 23, 2021

(51) Int. Cl.
*G06F 1/00*   (2006.01)
*G06F 1/26*   (2006.01)
*G06F 1/3206* (2019.01)

(52) U.S. Cl.
CPC ............ *G06F 1/263* (2013.01); *G06F 1/3206* (2013.01)

(58) Field of Classification Search
CPC .............................. G06F 1/263; G06F 1/3206
See application file for complete search history.

(56) References Cited

U.S. PATENT DOCUMENTS 6,483,204 B2   11/2002  Hanaki
7,526,659 B2    4/2009  Sawyers et al.
(Continued)

FOREIGN PATENT DOCUMENTS

| WO | WO2009086566 A1 | 7/2009 |
| WO | WO2016081904 A1 | 5/2016 |
| WO | WO2018118022    | 6/2018 |

*Primary Examiner* — Nitin C Patel
(74) *Attorney, Agent, or Firm* — Tong Rea Bentley & Kim

(57) ABSTRACT

In example implementations, an apparatus is provided. The apparatus includes a plurality of power inputs, a plurality of power outputs, a power management component, and a power source capability information translation component. The plurality of power inputs is coupled to power sources. The plurality of power outputs is coupled to electronic devices. The power management component is coupled to the plurality of power inputs and the plurality of power outputs to manage deliver of power. The power source capability information translation component is coupled to the power management component and an external source that provides a power source capability information of a power source connected to a power input of the plurality of power inputs. The power management component delivers the power from the power source to a power output of the plurality of power outputs in accordance with the power source capability information received from the external source.

12 Claims, 5 Drawing Sheets

(56) References Cited

U.S. PATENT DOCUMENTS

| | | |
|---|---|---|
| 7,960,944 B2 | 6/2011 | Hoffman et al. |
| 7,999,412 B2 | 8/2011 | Lanni |
| 8,261,100 B2 | 9/2012 | Paniagua, Jr. et al. |
| 9,712,068 B2 | 7/2017 | Suzuki |
| 2004/0145348 A1 | 7/2004 | Bucur et al. |
| 2010/0001689 A1 | 1/2010 | Hultman et al. |
| 2012/0071215 A1* | 3/2012 | Bourque .............. G06F 1/266 455/573 |
| 2013/0326237 A1* | 12/2013 | Holdengreber ......... H02J 9/061 713/300 |
| 2016/0282892 A1* | 9/2016 | Saavedra ............... G05B 15/02 |
| 2017/0054296 A1 | 2/2017 | Daniel et al. |
| 2017/0222446 A1 | 8/2017 | Tan et al. |
| 2017/0322609 A1 | 11/2017 | Kunnathur Ragupathi et al. |

* cited by examiner

POWER MANAGEMENT IN POWER ADAPTERS TO DELIVER POWER TO A POWER OUTPUT COUPLED TO AN ELECTRONIC DEVICE IN ACCORDANCE WITH POWER SUPPLY CAPABILITY INFORMATION

BACKGROUND

Electronic devices are powered by a power source. The power source can provide power to power a processor of the electronic device, to illuminate a display of the electronic device, to enable an exchange of communication signals to and from the electronic device, and the like. The electronic device can be powered by a variety of different powers sources. In some instances, devices can be powered by direct current (DC) power sources or alternating current (AC) power sources.

DETAILED DESCRIPTION

Examples described herein provide a power adapter that has multiple power inputs and power outputs that can receive power supply capability information that is communicated from an external source. As discussed above, electronic devices can use power from a power source to operate. In some instances, the power source may be a direct current (DC) power source that is packaged and sold with the electronic device. Thus, the DC power source may be compatible with the electronic device and allow the electronic device to operate at the maximum power settings.

However, in some instances the electronic device may be powered by a non-standard power supply, or a power supply that was not distributed with the electronic device. In these instances, the power capability information may not be available or not communicated to the electronic device. As a result, the electronic device may operate at the lowest power setting or not operate at all. Another possibility may be that the electronic device, not knowing the power output capabilities of the power supply, may overdraw current from the power supply and cause the power supply to fail or otherwise stop providing power.

Examples herein provide an adapter with multiple power inputs and power outputs that can receive power supply capability information from an external source. In other words, the power supply capability information can be communicated from a source outside of the power supply itself. For example, the power supply capability information can be communicated by a user via input switches on the power adapter or via a remotely located power environment console. Thus, the electronic devices connected to the power outputs of the adapter can operate at a maximum power setting based on the power supply capability information from the external source if the power source connected to the power inputs of the adapter do not communicate the power supply capability information.

In addition, the adapter may manage the multiple power inputs and the multiple power outputs. For example, the adapter may manage which power output may receive power from which power source connected to the power inputs. The adapter may also provide redundancy via the power inputs if one power input fails. Also, the adapter may manage charging of a battery connected to one of the power inputs via a power source connected to another power input of the adapter. Thus, the adapter provides power source management and the ability of electronic devices to operate at a maximum power setting even when the power capability information is not communicated by a power source.

Figure 1:
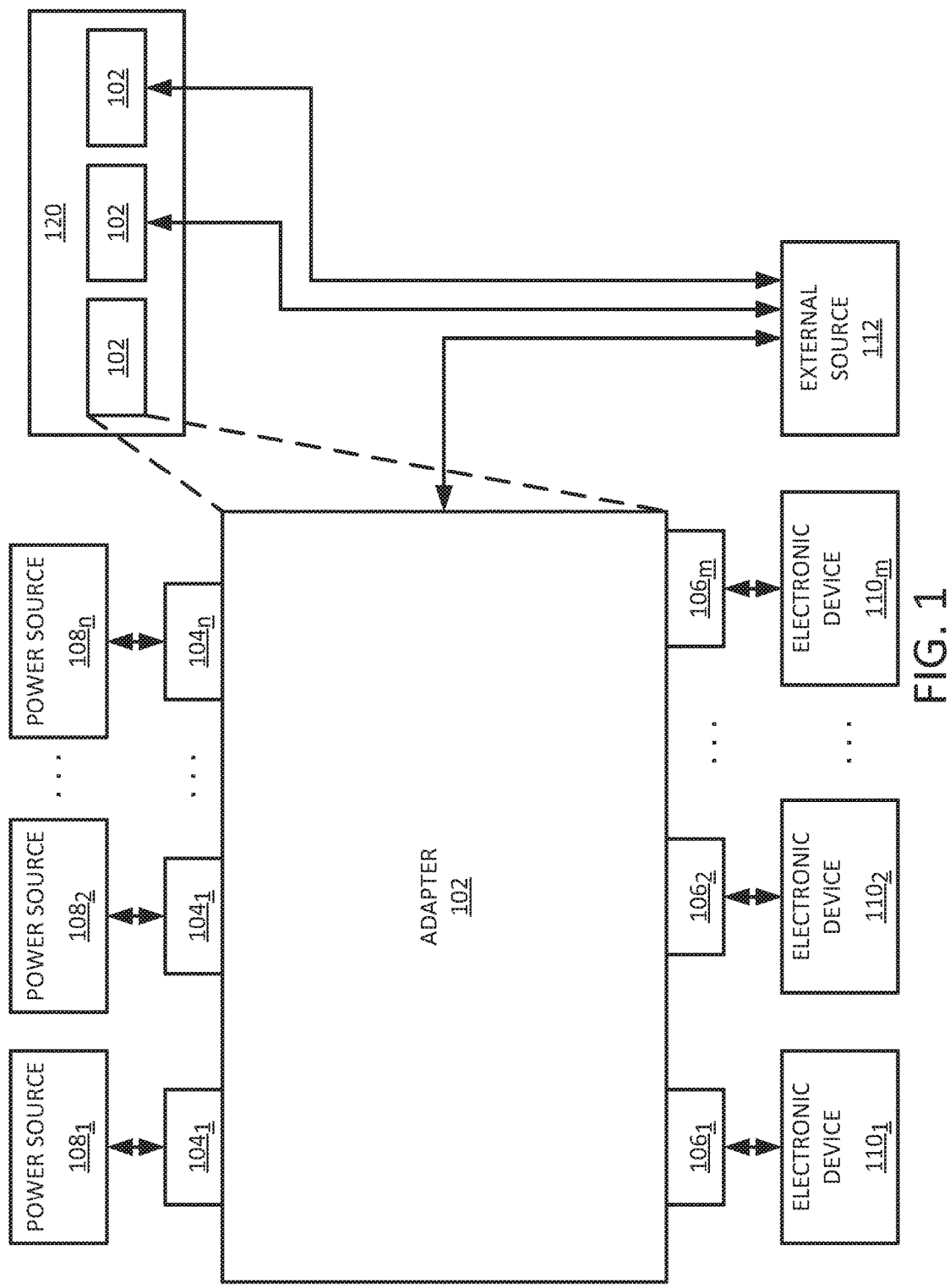
FIG. 1 is a block diagram of an example system of multiple power sources connected to multiple devices via power adapters of the present disclosure.

FIG. 1 illustrates a block diagram of a system 100 of the present disclosure. In one example, the system 100 may include an adapter 102. The adapter 102 may include a plurality of power inputs $104_1$-$104_n$ (hereinafter also referred to individually as a power input 104 or collectively as power inputs 104). In one example, the power inputs 104 may comprise direct current (DC) barrel jacks or power interfaces.

The power inputs 104 may be connected to respective power sources $108_1$ to $108_n$ (hereinafter also referred to individually as a power source 108 or collectively as power sources 108). The power sources 108 may be DC power sources. The power sources 108 may be any type of DC power source such as a battery, an alternating current to direct current (AC/DC) converter (also known as a DC power brick), a connection to a DC power outlet, and the like.

In one example, the adapter 102 may include a plurality of power outputs $106_1$ to $106_m$ (hereinafter also referred to individually as a power output 106 or collectively as power outputs 106). In one example, the power outputs 106 may comprise direct current (DC) barrel jacks or power interfaces. The power outputs 106 may be connected to respective electronic devices $110_1$ to $110_m$ (hereinafter also referred to individually as an electronic device 110 or collectively as electronic devices 110).

In one example, the electronic devices 110 may be any type of electronic device that may be powered via a DC power source (e.g., the power sources 108). Examples of the electronic devices 110 may include a laptop computer, a desktop computer, a tablet computer, a thin client computer, a portable electronic device, an electronic component that is part of a console, a docking station for charging an electronic device, and the like.

In one example, the number of n power inputs may be different than the number of m power outputs. In one example, the number of n power inputs may be the same as the number of m power outputs.

In one example, the electronic devices 110 may operate via DC power that is supplied by one of the power sources 108. For example, the adapter 102 may manage a pool of power sources 108 and distribute power from the power sources 108 to respective electronic devices 110 via the power outputs 106.

In one example, the adapter 102 may manage a pool of power sources 108 to provide power redundancy to one of the electronic devices 110. For example, if one power source 108 were to fail, the adapter 102 may provide power from another power source 108 to the electronic device 110. For example, the electronic device 110 may be a computer that is remotely located (e.g., in a space station) where power reliability is important. The adapter 102 may manage multiple DC power sources (e.g., the power sources 108) to ensure that if one power source 108 fails the electronic device 110 is switched over to another power input 104 connected to another power source 108.

In one example, the adapter 102 may be communicatively coupled to an external source 112. The external source 112 may provide power capability information. The power capability information may indicate to the electronic devices 110 the power capabilities of a respective power source 108. The power capability information can be provided by the external source 112 when the power capability information is not provided by the power source 108, or to override the power capability information provided by the power source 108.

Thus, the adapter 102 may allow the electronic devices 110 to operate with power sources 108 that are non-standard. In other words, non-standard power sources may be power sources that were not manufactured for use with a particular electronic device 110 or third party power sources.

Details of the components within the adapter 102 that perform the power management and processing of the power capability information are discussed in further details below. Thus, the adapter 102 of the present disclosure manages delivery of power from multiple power sources 108 via multiple power inputs 104 to multiple electronic devices 110 via multiple power outputs 106.

In addition, the adapter 102 of the present disclosure may provide remote communications to the external source 112. Thus, the adapter 102 may provide the capability for the external source 112 to provide power capability information and/or transmit monitoring or status information to the external source 112.

In one example, a plurality of adapters 102 may be arranged in a rack 120. For example, multiple adapters 102 may be placed in a rack arrangement to connect many different power sources 108 to many different electronic devices 110. Thus, the remote communication capability of the adapter 102 may allow the external source 112 to remotely manage or control the adapters 102 and the power sources 108. For example, a single control signal or command may be used to control a plurality of power sources 108.

Figure 2:
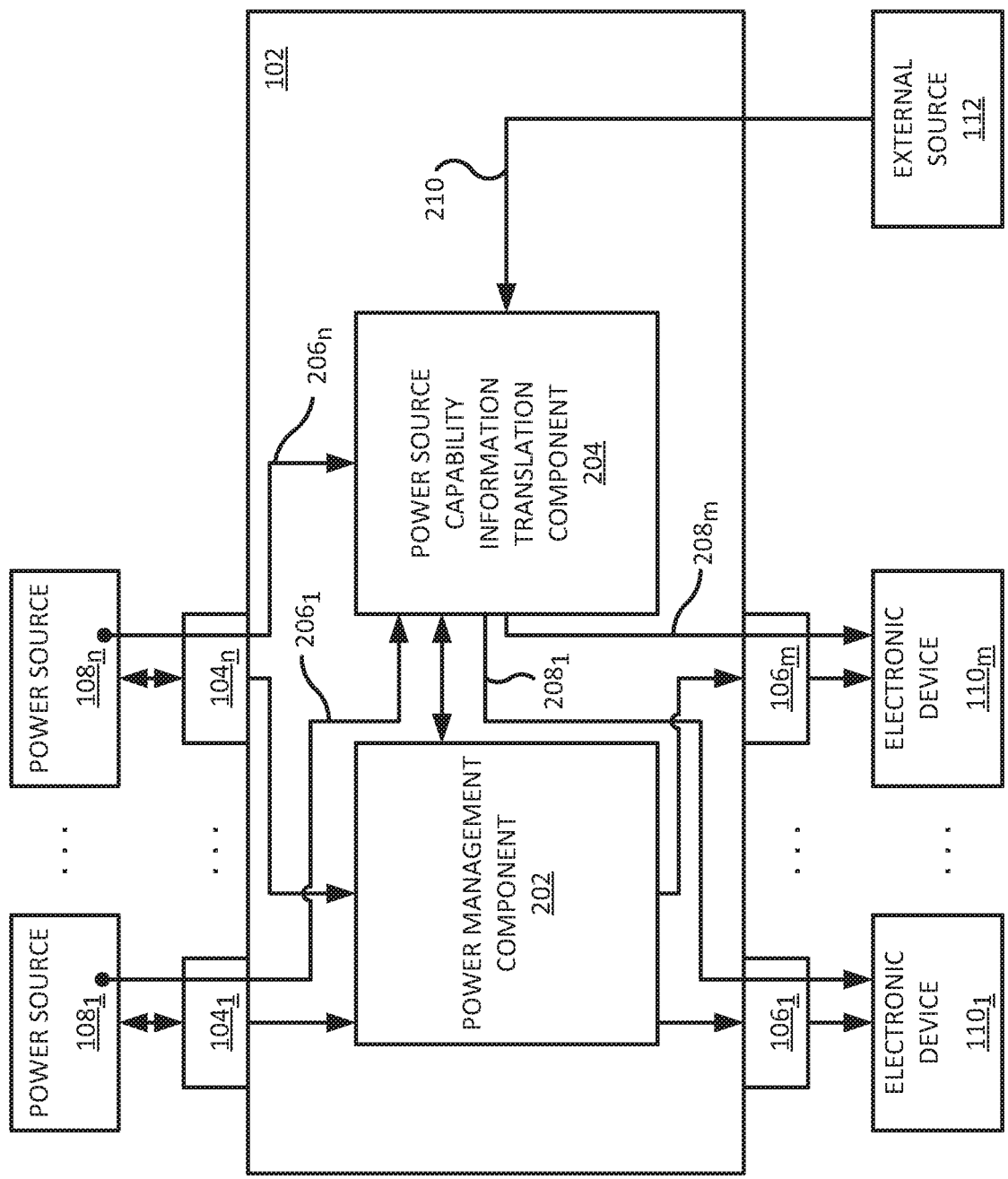
FIG. 2 is a block diagram of an example power adapter of the present disclosure.

FIG. 2 illustrates a detailed block diagram of the adapter 102. FIG. 2 illustrates the power sources 108 connected to the power inputs 104 and the electronic devices 110 connected to the power outputs 106, similar to FIG. 1.

Figure 5:
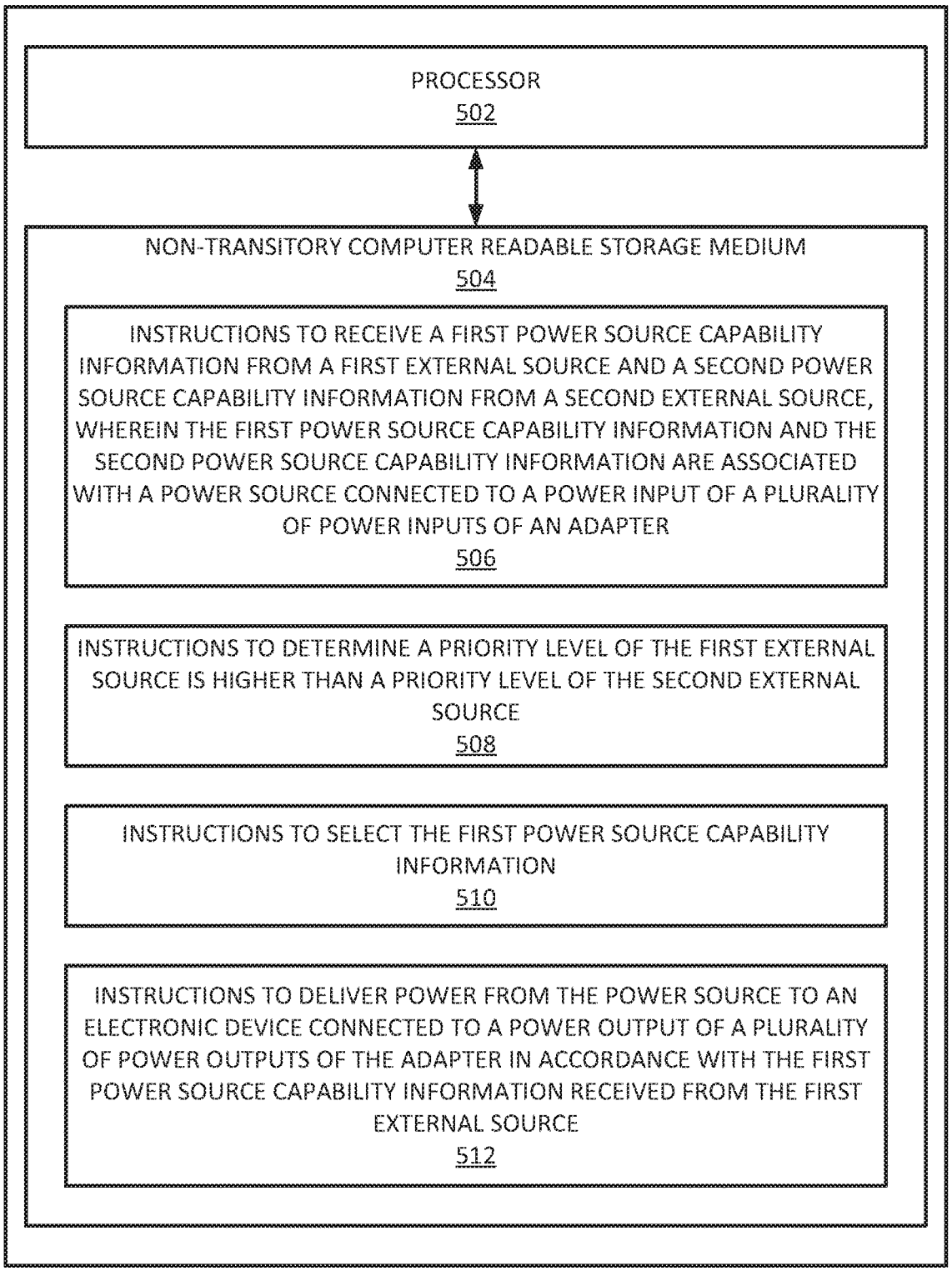
FIG. 5 is a block diagram of an example non-transitory computer readable storage medium storing instructions executed by a processor to communicate a power supply capability information in a power adapter.

In one example, the adapter 102 may also include a power management component 202 and a power source capability information translation component 204. The power management component 202 and the power source capability information translation component 204 may be deployed in hardware as a discrete circuit or may be deployed as instructions stored in memory that are executed by a processor (e.g., as shown in FIG. 5 and discussed below).

In one example, the power management component 202 may be communicatively coupled to the power inputs 104 and the power outputs 106. The power management component 202 may manage the pool of power sources 108 to power the electronic devices 110, as described above.

In one example, the power management component 202 may provide voltage monitoring, input isolation, charging, and output regulation circuitry. In one example, the power management component 202 may include a charge sense and control circuitry and a voltage regulation circuitry. For example, the charge sense and control circuitry may monitor for over current or over voltage events and then protect the adapter 102, the power sources 108, and electronic devices 110. Based on the sensed current or voltage, the power management component 202 may shut off an input 104, request that an electronic device 110 draw less current or voltage, and the like.

In one example, one of the power inputs 104 may be connected to a battery that is being recharged via another power source 108 connected to another power input 104. The charge sense and control circuitry may also control charging of the battery via the power inputs 104.

In one example, the voltage regulation circuitry may control or regulate the voltage levels of the power sources 108. In other words, the voltage regulation circuitry may regulate an amount of power that is delivered from the power inputs 104 based on the power levels monitored by the charge sense and control circuitry. For example, the power sources 108 may provide different power at different voltage levels. The voltage regulation circuitry may control the voltage such that the voltage from different power sources 108 is output at a set output level.

In one example, the power management component 202 may be communicatively coupled to the power source capability information translation component 204. The power source capability information translation component 204 may receive power source capability information from the power sources 108 directly, or from the external source 112.

In one example, the power inputs 104 may be DC barrel jacks or power interfaces. One pin in the DC power interface may be used to communicate power source capability information to the power source capability information translation component 204. For example, the signaling lines $206_1$ to $206_n$ may be used to transmit the power source capability information to the power source capability information translation component 204. In one example, a signaling line 210 may be used to transmit the power source capability information to the power source capability information translation component 204 from the external source 112.

As discussed above, the power source capability information may provide information to an electronic device 110 about the power source capability of a respective power source 108. For example, the power source capability information may provide information related to a maximum power output of the power source 108, a current rating of the power source 108, a voltage output capability of the power source 108, and the like. Based on the power source capability information, the electronic device 110 may request a certain power level.

As noted above, when the power source 108 is a non-standard power source, the power source 108 may not communicate the power source capability information. As a result, the electronic device 110 may operate at a minimum power level or not operate at all.

The power source capability information translation component 204 of the present disclosure allows the external source 112 to provide the power source capability information. As a result, the electronic device 110 may operate at a maximum power efficiency when the power source 108 fails to provide the power source capability information. For example, the external source 112 may know what kind of power source 108 is connected to a power input 104 and provide the power source capability information to the power source capability information translation component 204. The power source capability information translation component 204 may then communicate the power source capability information to the electronic device 110 via the signaling lines $208_1$ to $208_m$.

In another example, the power source capability information from the external source 112 may be used to override the power source capability information from the power source 108. For example, the power source capability information from the power source 108 may indicate the ability to provide power and voltage at a first level. However, a user may know that the power source 108 may actually provide power and voltage at a higher level. The user may provide the power source capability information via the external source 112 to override the power source capability information received from the power source 108.

The power management component 202 may deliver power from the power source 108 to the power output 106 to the electronic device 110 in accordance with the power source capability information received from the external source 112. Thus, the electronic device 110 may request a higher amount of power from the power source 108 based on the power source capability information received from the external source 112 rather than the power source capability information received from the power source 108.

In one example, the power management component 202 may also use the power source capability information to manage the pool of power sources 108. For example, the power management component 202 may request the electronic device 110 to draw less current based on the power source capability information.

In one example, the power management component 202 may assign a power input 104 to a power output 106 based on the power source capability information. For example, a power source $108_1$ connected to the power input $104_1$ may provide a first voltage level and a first power output. An electronic device $110_2$ connected to the power output $106_2$ may use the first voltage level and the first power output. As a result, the power management component 202 may assign the power input $104_1$ to the power output $106_2$ such that the power from the power source $108_1$ is delivered to the electronic device $110_2$.

In another example, the power management component 202 may see that the power sources $108_1$ and $108_2$ connected to the power inputs $104_1$ and $104_2$, respectively, can output a first voltage level and a first power output level. An electronic device $110_1$ connected to the power input $106_1$ may use the first voltage level and the first power output level. No other power sources 108 may provide the first voltage level and the first power output level. The power management component 202 may assign the power input $104_1$ to the power output $106_1$. In addition, the power management component 202 may reserve the power input $104_2$ as a redundant, or fail over, power source in case the power source $108_1$ fails. In other words, the power management component 202 may not assign the power input $104_2$ to any other electronic devices $110_2$-$110_m$.

Figure 3:
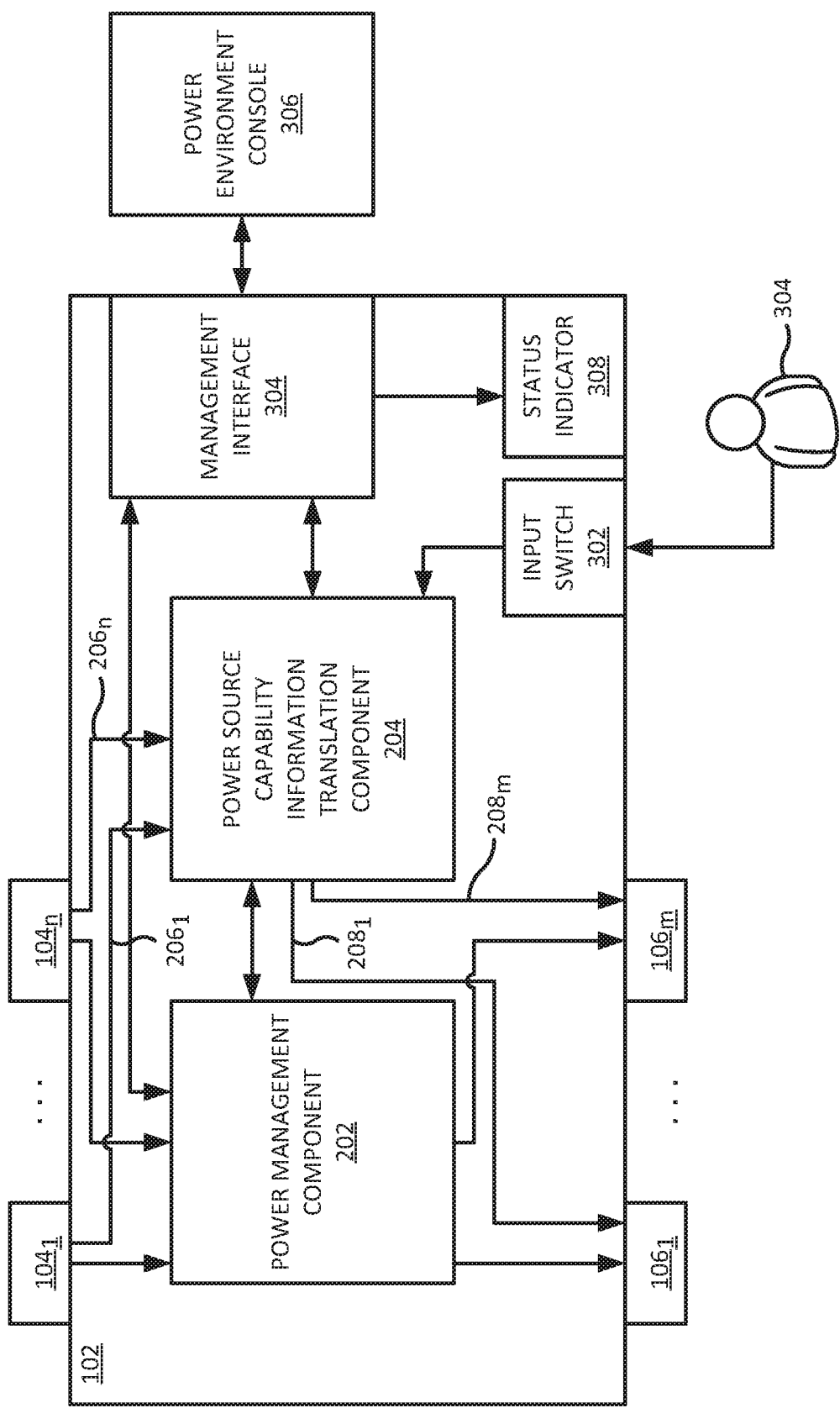
FIG. 3 is a more detailed block diagram of an example power adapter of the present disclosure.

FIG. 3 illustrates a more detailed block diagram of the adapter 102. FIG. 3 illustrates all of the components of the adapter 102 illustrated in FIG. 2. However, FIG. 3 illustrates more details of the external source 112.

In one example, the external source 112 may include a user 304 who provides inputs via an input switch 302. For example, the adapter 102 may include physical buttons or switches, a graphical user interface, and the like, that can be used by the user 304 to provide the power source capability information to the power source capability information translation component 204. In other words, the input switch 302 may be part of the adapter 102.

In one example, the external source 112 may include a power environment console 306. The power environment console 306 may be a server, a computer, a processor with memory, and the like. The power environment console 306 may be remotely located from the adapter 102 (e.g., another physical location).

In one example, the adapter 102 may include a management interface 304. The management interface 304 may include a communication interface to provide a wired or wireless communication path to and from the power environment console 306. For example, the management interface 304 may include an Ethernet port, a wireless radio, and the like. The power environment console 306 may provide power source capability information of a power source 108 to the power source capability information translation component 204 via the management interface 304.

In one example, the management interface 304 may include a wired or wireless communication interface to communicate with other management interfaces 304 on other adapters 102 to communicate as a mesh network. For example, one adapter 102 may receive a command from the power environment console 306, via the management interface 304. That adapter may then relay the command from the power environment console 306 to plurality of adapters 102 that are able to communicate directly between management interfaces 304.

In one example, the management interface 304 may be communicatively coupled to the power management component 202. The power management component 202 can be used to monitor the power sources 108, as described above. In one example, the power management component 202 may provide monitoring information, status information, and the like, of the power sources 108 to the power environment console 306 via the management interface 304. Thus, the management interface 304 may provide two-way communication capability between the adapter 102 and the power environment console 306.

In one example, the power environment console 306 may be communicatively coupled to a plurality of different adapters 120 (e.g., the rack 120 of adapters 102 illustrated in FIG. 1). As a result, the power environment console 306 may be used to monitor the status of power sources 108 connected to different adapters 102 at the same time. In addition, the power environment console 306 may be used to send power source capability information to a plurality of adapters 102 at the same time rather than manually providing the power source capability information one adapter 102 at a time via the input switch 302.

In one example, the power source capability information translation component 204 can receive the power source capability information from the power source 108, the input switch 302, or the power environment console 306. In one example, the power source capability information translation component 204 may prioritize the power source 108, the input switch 302, and the power environment console 306. For example, the power environment console 306 may be assigned a highest priority, the input switch 302 a second highest priority and the power source 108 the lowest priority. Thus, if the power source capability information translation component 204 receives the power source capability information from the power source 108 only, then the power source capability information from the power source 108 may be transmitted to the electronic device 110.

In another example, the power source capability information may be received from the power source 108 and the input switch 302. Since the input switch 302 has a higher priority than the power source 108, the power source capability information from the input switch 302 may sent to the electronic device 110.

In another example, the power source capability information may be received from the power source 108, the input switch 302, and the power environment console 306. Since the power environment console 306 has the highest priority, the power source capability information from the power environment console 306 may be sent to the electronic device 110, and so forth.

In one example, the adapter 102 may include a status indicator 308. The status indicator 308 may be communicatively coupled to the management interface 304. The status indicator 308 may include an indicator light, an audible alarm, a graphical user interface, a display, and the like. The status indicator 308 may generate an alert or alarm in response to a failure detected by the power management component 202.

As discussed above, the power management component 202 may transmit monitoring information or status information associated with the power supplies 108 to the power environment console 306 via the management interface 304. When the management interface 304 receives an error status, a failure status, and the like, from the power management component 202, the management interface 304 may activate the status indicator 308. The status indicator 308 may provide a local alert or alarm to the user 304 and/or remote users via the power environment console 306.

In another example, when the management interface 304 receives an error status, a failure status, and the like, from the power management component 202, the management interface 304 may both activate the status indicator 308 for a local user 304, as well as communicate the error status, the failure status, and the like, to the power environment console 306.

Thus, FIGS. 1-3 illustrate different examples of the adapter 102 of the present disclosure. As noted above, the adapter 102 of the present disclosure provides multiple power inputs 104 and multiple power outputs 106 for electronic devices 110. The adapter 102 may manage a pool of power resources 108 to deliver power to the electronic devices 110.

In addition, the adapter 102 of the present disclosure provides remote communication capability. As a result, the power source capability information may be received from the external source 112 when the power source capability information is not available from the power source 108. Thus, the adapter 102 may allow non-standard power sources to be used with the electronic devices 110. In addition, the electronic devices 110 may operate at a maximum power level even when the power source capability information is not available from the power source 108.

Figure 4:
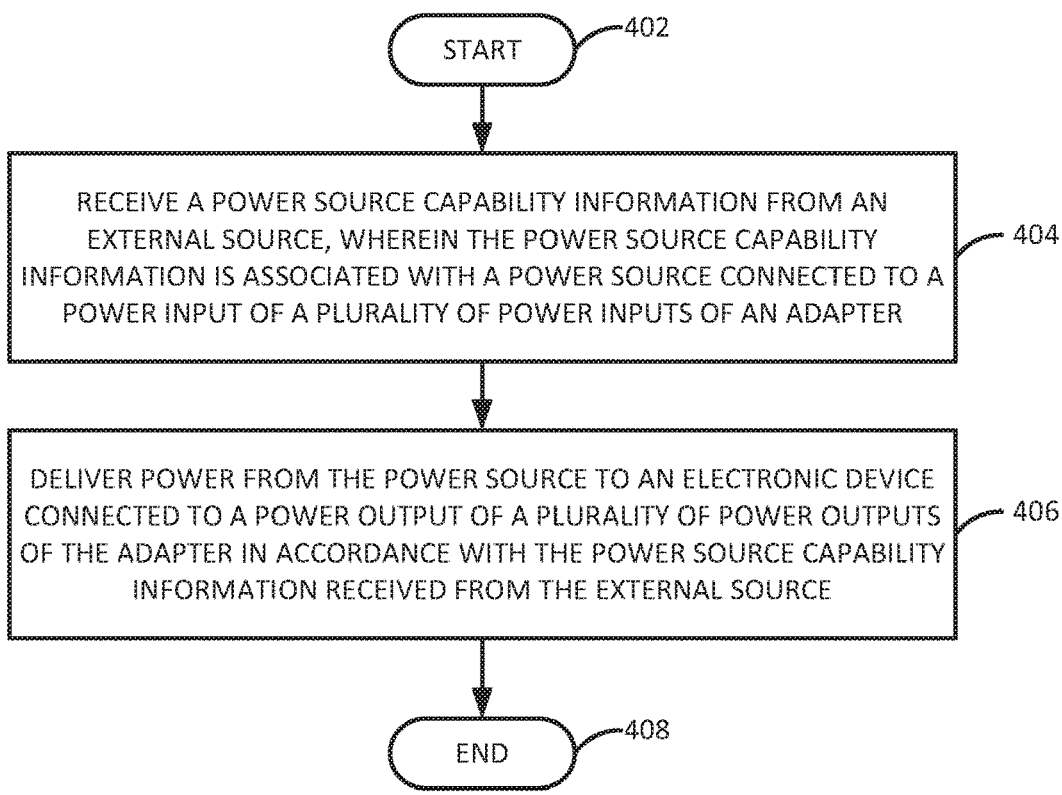
FIG. 4 is a flow chart of an example method for communicating a power supply capability information in a power adapter.

FIG. 4 illustrates a flow diagram of an example method 400 for communicating power supply capability information in a power adapter. In an example, the method 400 may be performed by the adapter 102 or the apparatus 500 illustrated in FIG. 5 and described below.

At block 402, the method 400 begins. At block 404, the method 400 receives a power source capability information from an external source, wherein the power source capability information is associated with a power source connected to a power input of a plurality of power inputs of an adapter. In one example, the external source may be a physical input on the adapter or a remotely located power environment console.

For example, the power source may be a non-standard power source and fail to provide power source capability information. Thus, a user may provide the power source capability information via the physical inputs or the power source capability information may be transmitted from the power environment console.

In one example, the power source may provide power source capability information. However, the user may override the power source capability information from the power source with the power source capability information from the physical inputs or the power environment console. In one example, the power source capability information from the power source, the physical inputs, and the power environment console may be prioritized. Thus, if the power source capability information is received from multiple sources, the priority of the sources may determine which power source capability information is used. For example, the power source capability information from the power environment console may override the power source capability information from the physical input switch. In another example, the physical input switch on the adapter may include settings that allow for a local user to set the priority of the different sources of power source capability information.

At block 406, the method 400 delivers power from the power source to an electronic device connected to a power output of a plurality of power outputs of the adapter in accordance with the power source capability information received from the external source. For example, the power source capability information may provide the power capability of the power source to the electronic device. As a result, the electronic device may request power at a maximum level that can be provided by the power source based on the power source capability information. At block 408, the method 400 ends.

FIG. 5 illustrates an example of an apparatus 500. In one example, the apparatus 500 may be the adapter 102. In one example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions to communicate power supply capability information in a power adapter.

In one example, the instructions 506 may include instructions to receive a first power source capability information from a first external source and a second power source capability information from a second external source, wherein the first power source capability information and the second power source capability information are associated with a power source connected to a power input of a plurality of power inputs of an adapter. The instructions 508 may include instructions to determine a priority level of the first external source is higher than a priority level of the second external source. The instructions 510 may include instructions to select the first power source capability information. The instructions 512 may include instructions to deliver power from the power source to an electronic device connected to a power output of a plurality of power outputs of the adapter in accordance with the first power source capability information received from the first external source.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   a plurality of power inputs coupled to power sources;
   a plurality of power outputs coupled to electronic devices;
   a power management component coupled to the plurality of power inputs and the plurality of power outputs to manage delivery of power;
   a power source capability information translation component coupled to the power management component and an external source that provides a power source capability information of a power source connected to a power input of the plurality of power inputs, wherein the power management component delivers the power from the power source to a power output of the plurality of power outputs in accordance with the power source capability information received from the external source.

2. The apparatus of claim 1, wherein the plurality of power inputs and the plurality of power outputs comprise a direct current (DC) power interface.

3. The apparatus of claim 1, wherein the power management component is to monitor a power delivered from each of the plurality of power inputs and power delivered to each of the plurality of power outputs.

4. The apparatus of claim 3, wherein the power management component is to regulate the amount of power delivered from the plurality of power inputs based on the power that is monitored.

5. The apparatus of claim 3, wherein the power management component is communicatively coupled to the external source to report a status of the power that is monitored from the plurality of power inputs.

6. The apparatus of claim 1, wherein the external source comprises an input switch.

7. The apparatus of claim 1, wherein the external source comprises a remotely located power environment console.

8. The apparatus of claim 7, further comprising:
   a management interface communicatively coupled to the power management component and the remotely located power environment console.

9. The apparatus of claim 8, wherein the management interface is communicatively coupled to a status indicator to communicate an alert or a status.

10. A method, comprising:
    receiving, via a power source capability information translation component of an adapter that is coupled to an external source, a power source capability information from the external source, wherein the power source capability information is associated with a power source connected to a power input of a plurality of power inputs of the adapter; and
    delivering, via a power management component of the adapter that is coupled to the plurality of power inputs, a plurality of power outputs, and the power source capability information translation component of the adapter, power from the power source to an electronic device connected to a power output of the plurality of power outputs of the adapter in accordance with the power source capability information received from the external source.

11. The method of claim 10, wherein the external source comprises a physical input switch or a remotely located power environment console.

12. The method of claim 11, wherein a power source capability information from the remotely located power environment console overrides a power source capability information from the physical input switch.

* * * * *